(12) United States Patent
Yoda

(10) Patent No.: US 6,173,362 B1
(45) Date of Patent: Jan. 9, 2001

(54) STORAGE SYSTEM WITH SELECTIVE OPTIMIZATION OF DATA LOCATION

(75) Inventor: Nobuhisa Yoda, Kawasaki (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/917,351

(22) Filed: Aug. 26, 1997

(30) Foreign Application Priority Data

Dec. 24, 1996 (JP) ...................................................... 8-344039

(51) Int. Cl.[7] .......................................................... G06F 12/00
(52) U.S. Cl. .......................................... 711/114; 711/136
(58) Field of Search ................................. 711/114, 136; 395/492, 497.01, 674; 369/30, 34, 36

(56) References Cited

U.S. PATENT DOCUMENTS

| | | | |
|---|---|---|---|
| 4,090,236 | * 5/1978 | Bennett et al. ....................... | 711/211 |
| 4,528,624 | * 7/1985 | Kamionka et al. ................... | 395/674 |
| 4,607,346 | * 8/1986 | Hill ...................................... | 395/497.01 |
| 4,636,946 | * 1/1987 | Hartung et al. ....................... | 711/136 |
| 5,495,457 | * 2/1996 | Takagi .................................... | 369/30 |
| 5,566,348 | 10/1996 | Dahman et al. ....................... | 710/18 |
| 5,584,018 | * 12/1996 | Kamiyama .......................... | 395/492 |
| 5,619,687 | * 4/1997 | Langan et al. ....................... | 395/557 |
| 5,649,125 | * 7/1997 | Tietjen et al. ......................... | 395/306 |
| 5,732,406 | * 3/1998 | Bassett et al. ....................... | 711/104 |
| 5,890,014 | * 3/1999 | Long .................................... | 711/170 |

FOREIGN PATENT DOCUMENTS

| | | |
|---|---|---|
| 0 532 335 A1 | 3/1993 | (EP) . |
| 0 357 357 A1 | 4/1993 | (EP) . |
| 7-73090 | 3/1995 | (JP) . |
| WO 95/22825 | 8/1995 | (WO) . |

* cited by examiner

Primary Examiner—Do Hyun Yoo
Assistant Examiner—Nasser Moazzami
(74) Attorney, Agent, or Firm—Finnegan, Henderson, Farabow, Garrett & Dunner, L.L.P.

(57) ABSTRACT

An information storage system having a volume managing function and including a magnetooptical disk auto-changer, the system having data location optimizing means for, in accordance with access speed at which an access of data is made from each of disks, performing an optimizing function for optimizing data location in a case where data is stored in the disk, a volume management table for collecting and storing statistical information of data accesses for determining validity of the optimizing function when each of the disks has made an access to data, and data optimization determination means for determining validity of the optimizing function in accordance with the statistical information of data accesses.

66 Claims, 12 Drawing Sheets

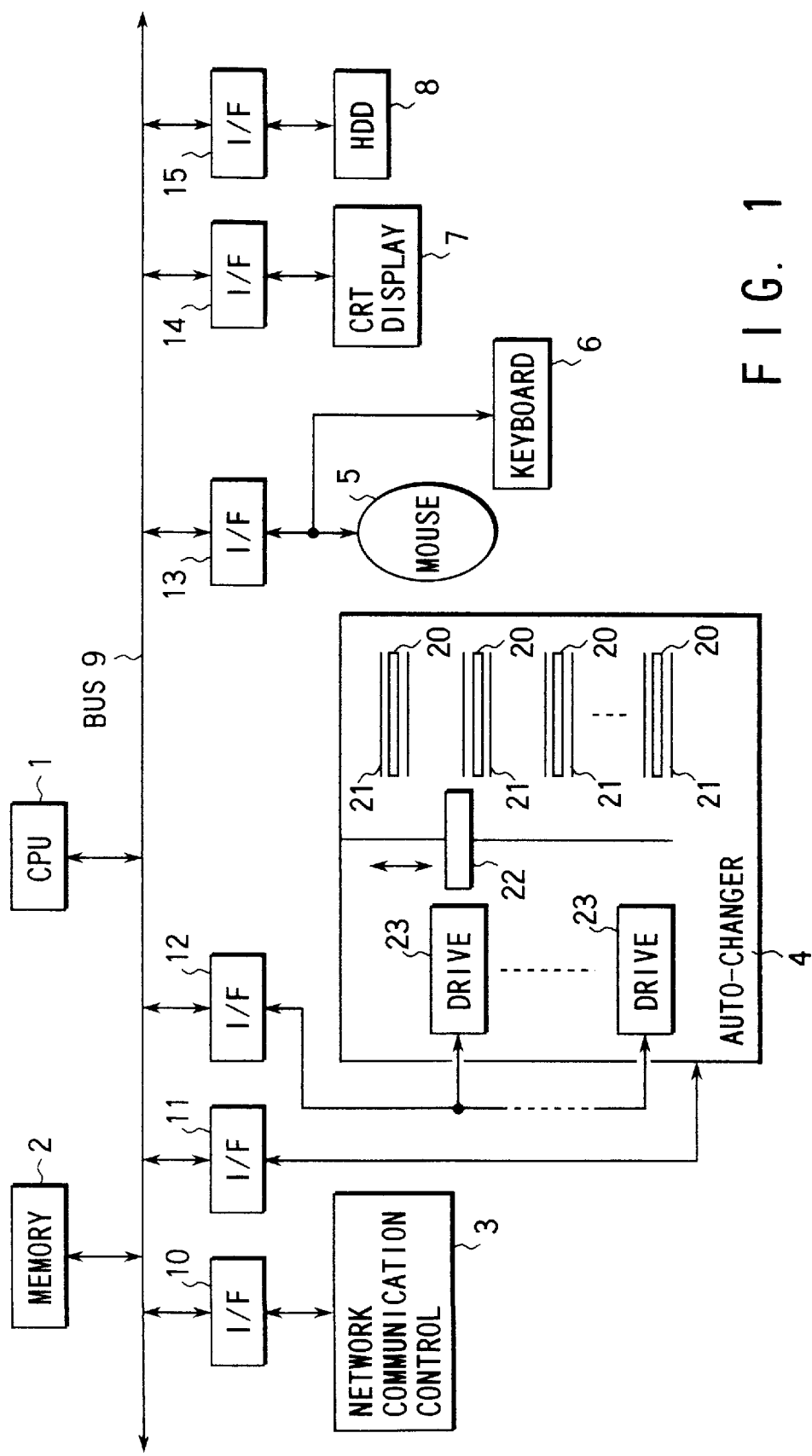
F I G. 1

VOLUME MANAGEMENT TABLE

| VOLUME ID | VOLUME NAME | ID LINES OF COMPONENT DISK | DISK ID USED IN PREVIOUS WRITE | VOLUME CAPACITY (USAGE RATIO) | OPTIMUM LOCATION BEING USED ? | ACCESS CONCENTRATION RATIO |
|---|---|---|---|---|---|---|
| 1 | ABD | 5,6,7,8,9 | 5 | 10 G BYTES (60%) | YES | 20 |
| 2 | AAA | 1 | 1 | 1 G BYTES (2%) | NO | 100 |
| 3 | GGG | 2,3,4 | 3 | 5 G BYTES (60%) | YES | 30 |
| ------ | ------ | ------ | ------ | ------ | ------ | ------ |

F I G. 3

| LOGICAL ADDRESS | PHYSICAL ADDRESS |
|---|---|
| 1 | 10001 |
| 2 | 10002 |
| 3 | 10003 |
| 4 | 10004 |
| 5 | 10512 |
| 6 | 10513 |
| 7 | 10514 |
| ... | ... |
| 511 | 10511 |
| 512 | 20100 |
| 513 | 20101 |
| 514 | 20102 |
| 515 | 10005 |
| 516 | 10006 |
| 517 | 10007 |
| 518 | 10518 |

FIG. 4

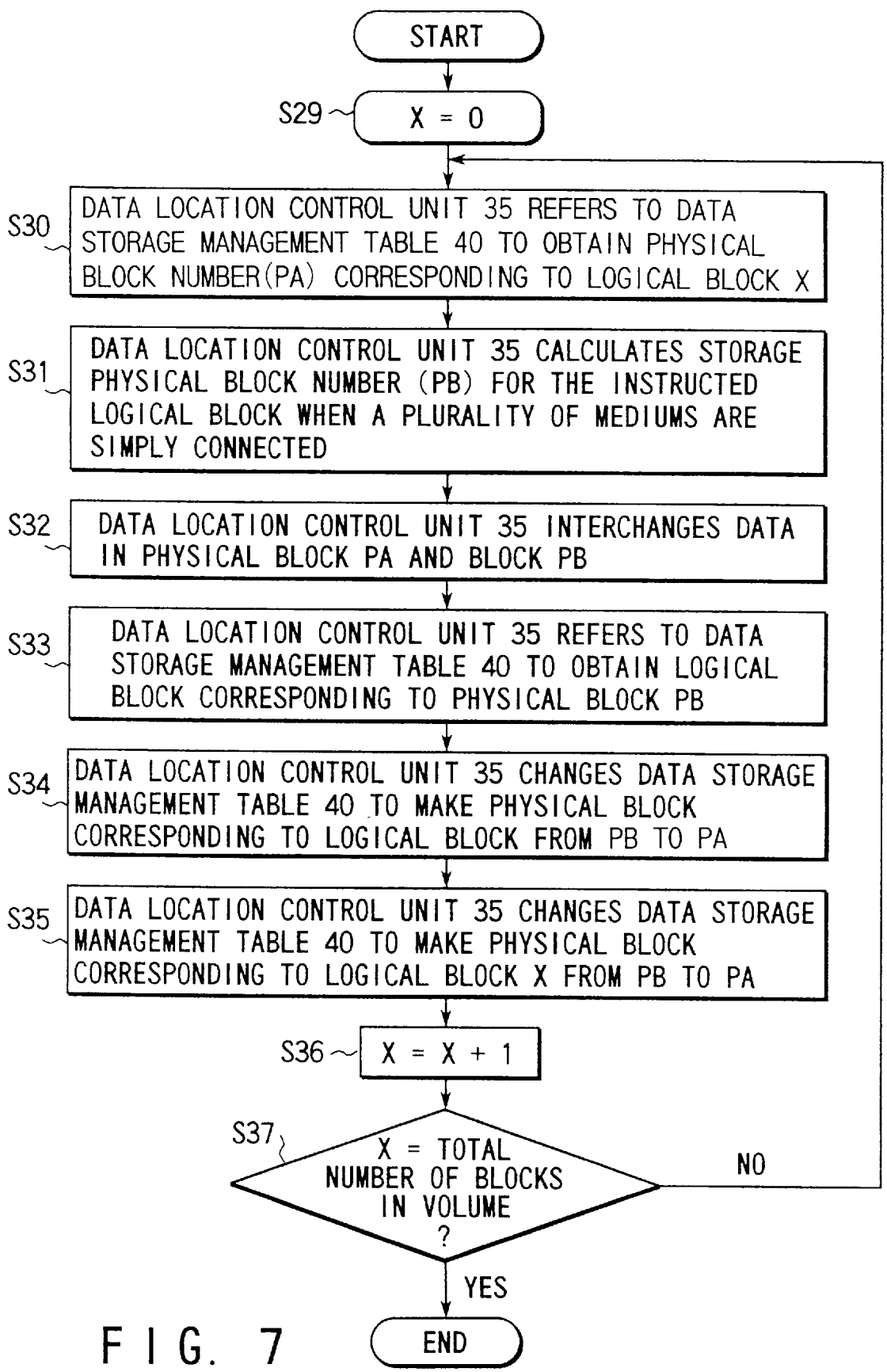
F I G. 7

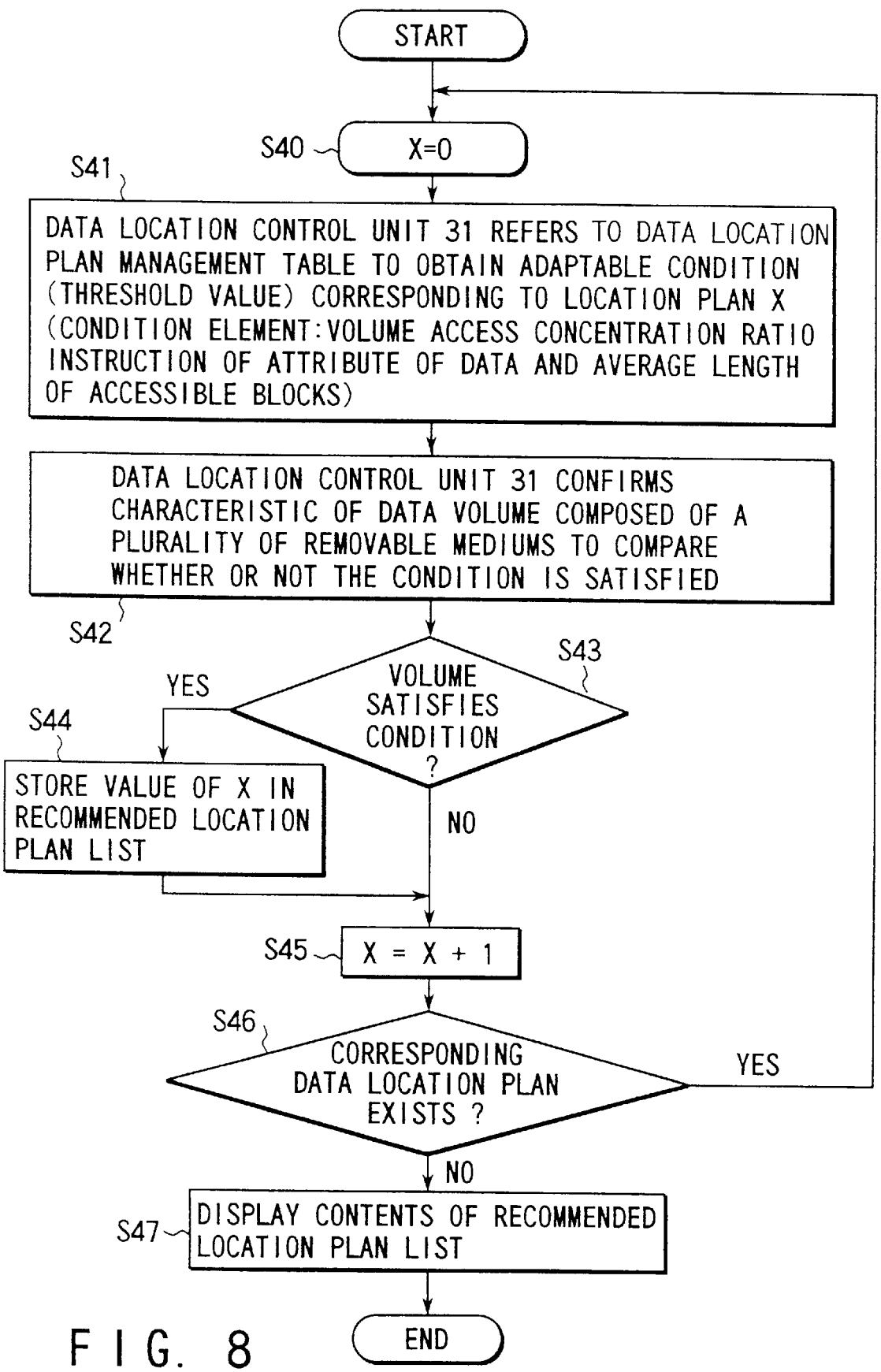
F I G. 8

VOLUME MANAGEMENT TABLE

| VOLUME ID | NAME OF VOLUME | DYNAMIC IMAGES | ID LINES OF COMPONENT DISKS | VOLUME CAPACITY | VOLUME USAGE RATIO | ID OF LOCATION PLAN | ACCESS CONCENTRATION RATIO | AVERAGE NUMBER OF ACCESSIBLE SUCCESSIVE BLOCK |
|---|---|---|---|---|---|---|---|---|
| 1 | ABC | YES | 1,2,3,4,5 | 10 G BYTES | 90% | 2 | 80 | 100 |
| 2 | ABC2 | NO | 10,12~15 16~20 | 20 G BYTES | 80% | 0 | 75 | 2 |
| 3 | XYZ | NO | 6,7,8 | 5 G BYTES | 20% | 0 | 20 | 10 |
| 4 | XYZ1 | NO | 9 | 1 G BYTES | 10% | 1 | 80 | 3 |
| 5 | XYZ2 | NO | 11,21 24 | 10 G BYTES | 90% | 2 | 5 | 500 |
| ------ | ------ | ------ | ------ | ------ | ------ | ------ | ------ | ------ |

FIG. 10

| IN OF DATA LOCATION PLAN | NAME | CONDITION (THRESHOLD VALUE) |
|---|---|---|
| 0 | MEDIA SIMPLE-CONNECTION TYPE (LOGICAL=PHYSICAL ADDRESS) | VOLUME USAGE RATIO<20% |
| 1 | CONCENTRATION TYPE | VOLUME USAGE RATIO≧20% AND AS WELL AS ACCESS CONDITION RATIO>70% |
| 2 | SEQUENTIAL ACCESS TYPE | INSTRUCTED ATTRIBUTE OF DATA IS DYNAMIC IMAGES AND AVERAGE NUMBER OF ACCESSIBLE BLOCKS IS 300 |
| ⋮ | ⋮ | ⋮ |

FIG. 11

IF FUNCTION FOR OPTIMIZING DATA LOCATION IS USED, DATA ACCESS SPEED CAN BE RAISED.
DO YOU WISH TO OPTIMIZE THE DATA LOCATION ?

[YES] [NO]

FIG. 12

STORAGE SYSTEM WITH SELECTIVE OPTIMIZATION OF DATA LOCATION

BACKGROUND OF THE INVENTION

The present invention relates to an information storage system adaptable to an optical disk storage system using a plurality of disks as storage mediums thereof and capable of performing data input and output operations by changing the disks, and having a mechanism for optimally locating data.

In recent years, a large-scale system has been structured in which a multiplicity of computers are connected in a network environment to interchange information. A system of the foregoing type employs a method in which a computer, called a server, uses an information storage device having a very large capacity to concentrically manage all information (images, data bases, audio information and characters) in the system. The above-mentioned system involves considerable enlargement of the quantity of information in the system which must be managed by the server. Therefore, there arises a requirement to enlarge the storage capacity of the information storage device.

The information storage device, as known, includes a hard disk unit (a HDD) and a magnetooptical disk unit. In particular, an information storage system has been developed which uses a multiplicity of magnetooptical disks (hereinafter simply called as "disks") as the storage mediums therein and which is called a magnetooptical disk auto-changer (also called a "jukebox") capable of changing and using the disks.

An information storage system of the foregoing type for changing and using the plural storage mediums uses a concept called a volume as a logical storage unit for managing information to be stored. In general, the volume, which is a physical storage unit, corresponds to one hard disk or one side of a magnetooptical disk. A portion of the above-mentioned magnetooptical disk auto-changer employs a system in which a plurality of disks are combined to set a volume having a very large capacity by one logical unit.

The magnetooptical disk auto-changer has a mechanism for moving a disk loaded into a slot in the apparatus by a carrier and setting the same to a disk drive disposed in the apparatus. The disk set to the disk drive is taken out by the carrier when it is no longer needed and moved to the slot. Then, another disk is set to the disk drive. The computer system controls the operation of the disk drive to perform input and output (read/write access) of data to and from the disk which has been set as described above.

The above-mentioned magnetooptical disk auto-changer is able to realize the foregoing information storage system having a very large capacity. However, the magnetooptical disk auto-changer encounters a problem of the performance caused from the movement of the disk in the apparatus. That is, time required to mechanically move the disk is, by about 1000 times, different from time required to perform a process of inputting/outputting data to and from the disk. In particular, when an access to requested data is made by the computer system, application software, which is operated on the system, is inevitably caused to wait for a period of time during which the disk storing required data is moved from the slot to the disk drive and data above is read from the disk. Therefore, the total performance of the system is degraded. In an example case where a connection to a network is established, remote terminal equipment on the network must wait during the foregoing period.

To overcome the problem of the unsatisfactory performance which has arisen due to the movement of the disk, it is effective to reduce the number of disk moving times. Specifically, a method has been suggested in which data, which must be stored in the disk, is previously and collectively managed and data is written at a stretch when a required disk is set to the disk drive so as to reduce the disk change frequencies (U.S. Pat. No. 4,636,946). A system for grouping a plurality of disks to logically use the same as one data storage volume may be combined with a method structured such that data, which is used at an operation, is stored in the same disk or data, to which accesses are made frequently, is concentrically stored in a specific disk so as to reduce the disk interchange frequencies.

As described above, in a case where the magnetooptical disk auto-changer is used to realize an information storage system using a plurality of disks, which can be interchanged, and having a very large capacity, time required for the disk, which is the storage medium, to be moved (interchanged) raises a problem of the deterioration in the performance, which is the reduction in the data access speed. To overcome the foregoing problem, a suggestion has been made in which the above-mentioned method is employed to reduce the disk interchange times. The foregoing method of raising the access speed corresponds to function of optimizing location of data which must be stored in the disk.

However, the optimization of the data location assumes certain data access conditions. In particular, the optimization assumes that, in terms of logical address, randomness of data access is fixed once a volume is created. That is, any conventional technology has not realized a system that dynamically corresponds to change in the data access pattern and manages the data location to optimize performance for each instance of data access pattern.

BRIEF SUMMARY OF THE INVENTION

Accordingly, an object of the present invention is to provide an information storage system which realizes an environment for optimizing data location to be adaptable to the data access and data usage environment and which is capable of improving the data access performance.

According to the present invention, there is provided an apparatus for optimizing data transfer in a storage system, comprising: data transfer means for transferring data in the storage system in accordance with a current data transfer function; collection means for collecting characteristics of data transfer in the storage system; and determination means responsive to the collection means for determining whether the characteristics indicate that the current data transfer function should be changed to a different data transfer function.

The system enables a process to be performed in which whether or not setting of the optimizing function of the volume is determined in accordance with the data access conditions and the data utilization environment, and then the optimizing function is set if an affirmative determination is performed and the optimizing function is suspended if a negative determination is performed. Moreover, a plurality of functions for optimizing the data location can be prepared and a selected optimizing function for locating data can be set to be adaptable to the data access conditions and data utilization environment.

The information storage system assumed to be realized by the present invention and having the structure such that a plurality of storage mediums, such as magnetooptical disks, are combined to manage volumes each having a very large capacity and serving as logical storage units generally employs a data location method in which a plurality of disk surfaces are simply connected to one another and serial logical block numbers are assigned to physical blocks existing in the connected surfaces to perform the management. In addition to the foregoing simple-connection type data location method, for example, a data location optimizing method is available in which data, which is probable to be accessed, is stored in the same disk. Moreover, an optimizing method is available in which data, which has been written newly, is intentionally concentrated into the same disk. The foregoing optimizing methods are structured on the basis of a statistical estimation that substantially 80% of data, which is the subject of the data access, is concentrated to about 20% of the overall quantity of data and that accesses are particularly concentrated to data which has been newly created, changed or updated. The foregoing optimizing methods enable the disk interchange times to be reduced.

However, the data access of the foregoing patterns specifically takes place at relatively limited frequencies. As a prerequisite corresponding to the foregoing patterns, for example, a condition is considered in which the size of data, to which an access is made at a stretch, is excessively small as compared with the capacity of the volume. Another condition is considered in which the quantity of data, to which a reference is made, is considerably larger than the quantity of data which is newly written. On the other hand, an applicable example, which does not meet the foregoing prerequisite, is considered in which the quantity of data stored in the volume is considerably smaller than the maximum data size which can be stored on one side of the disk. Another case can be considered in which dynamic image data corresponding to a long time is continuously written or read. Since the overall quantity of data is small in the former case, the state in which data is concentrated to a specific disk can be realized if consciousness relocation (optimization) of data is not performed. Although a large quantity of dynamic image data is treated in the latter case, accesses are not concentrated to a partial portion of data even if the data size is large. Therefore, the data relocation process arranged on an assumption that data accesses are concentrated probably results in an opposite effect being obtained in the performance because actual accesses are not concentrated to a specific disk.

That is, the specification for the optimum data location becomes different attributable to the characteristics, such as data access conditions and data utilization environment. Accordingly, it is an important factor for improving the performance of the system to provide a data location environment adaptable to the data access conditions and the data utilization environment. According to the present invention, a data location environment can be realized which has a function for determining the validity or the need of the function for optimizing the data location and which can be adapted to the data access conditions and data utilization environment by using results of the determination.

Moreover, the information storage system developed recently stores various information items, such as dynamic image data, text character information and audio information. Since the data access pattern (e.g., random access or sequential access) is different attributable to the type of data in the above-mentioned environment, data location adaptable to the type of data is required. Accordingly, the structure of the present invention has a means for monitoring the attribute of data as well as the data access characteristics which must be stored in the volume so as to set the optimum data location plan in accordance with results of monitoring. Moreover, data relocation can be performed, for example, at night at which accesses are not performed frequently because of the system operation, to be adaptable to the optimum data location, which has been set, so as to improve the data access process.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an essential portion of a computer system according to a first embodiment of the present invention;

FIG. 3 is a conceptual diagram showing the structure of a volume management table according to the first embodiment;

FIG. 4 is a conceptual diagram showing a data relocation process according to the first embodiment;

FIG. 7 is a flow chart of the operation of the first embodiment;

FIG. 8 is a flow chart of the operation of a second embodiment;

FIG. 10 is a diagram representing a volume management table according to the second embodiment;

FIG. 11 is a diagram depicting a data location plan management table according to the second embodiment.

FIG. 12 is a diagram illustrating a menu displayed on the CRT screen of the first embodiment, enabling a user to select the optimum data location function;

DETAILED DESCRIPTION OF THE INVENTION

Figure 2:
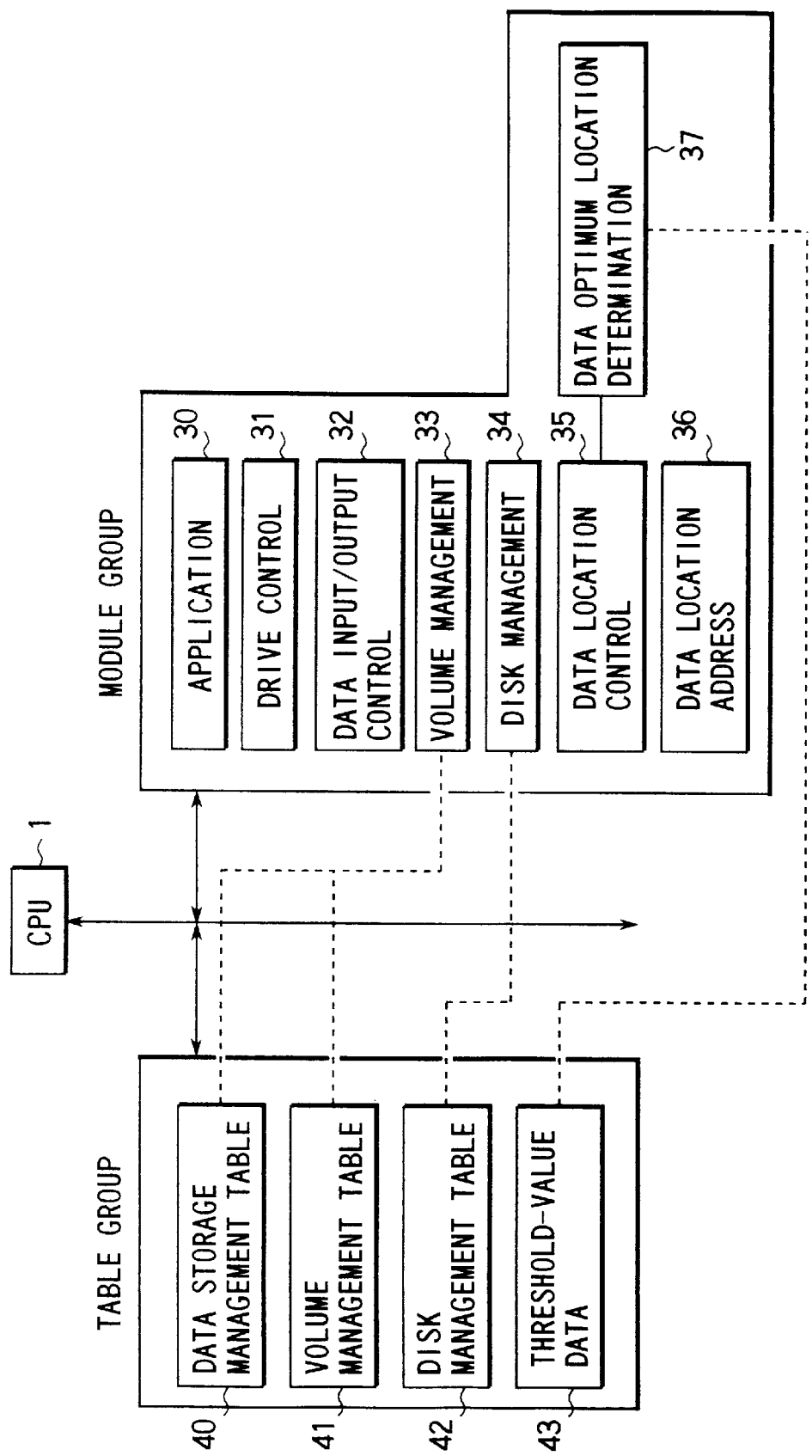
FIG. 2 is a conceptual diagram showing the software structure according to the first embodiment.

Referring to the drawings, embodiments of the present invention will now be described.

Figure 5:
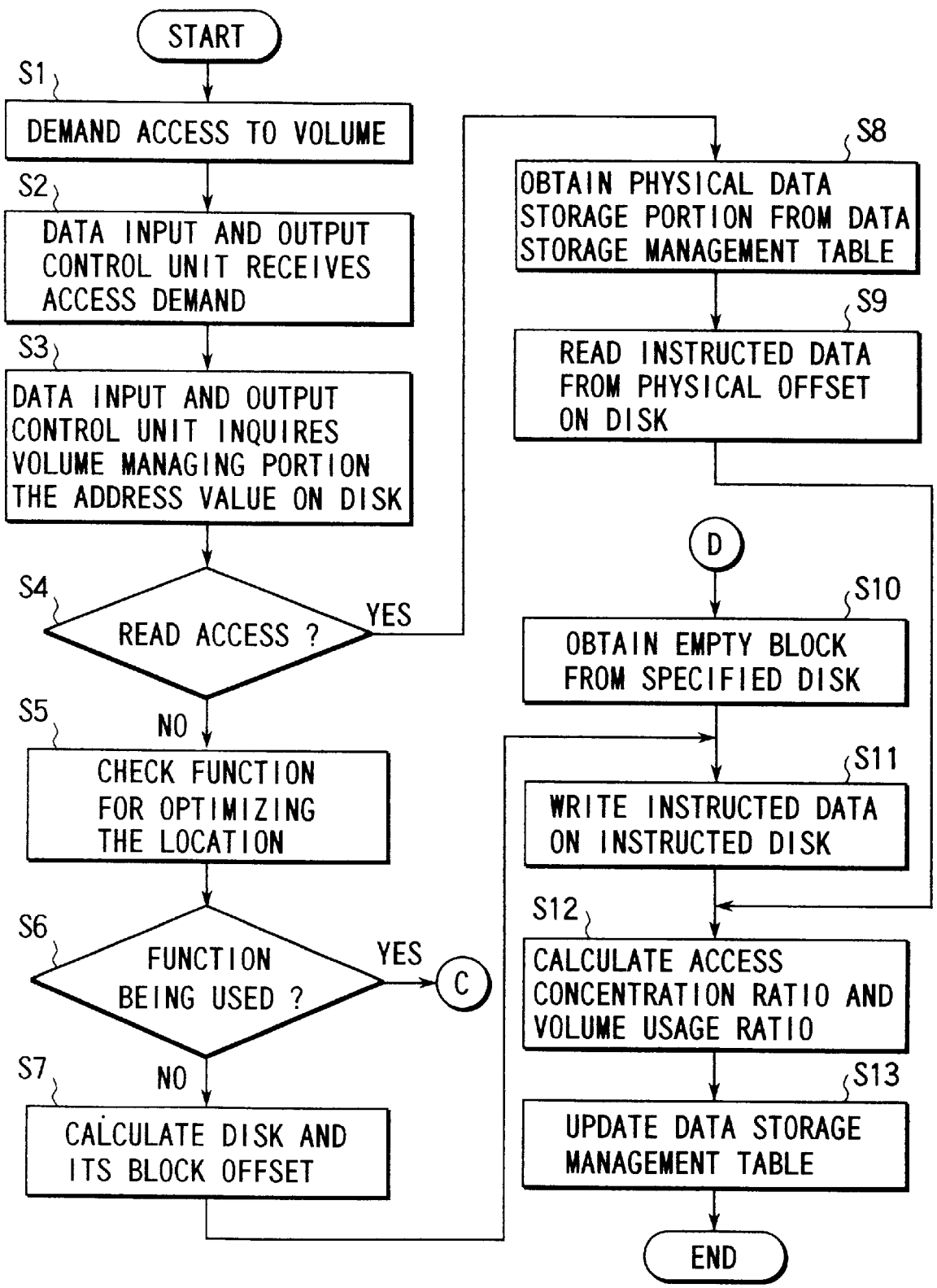
FIG. 5 is a flow chart of the operation of the first embodiment.
Figure 6:
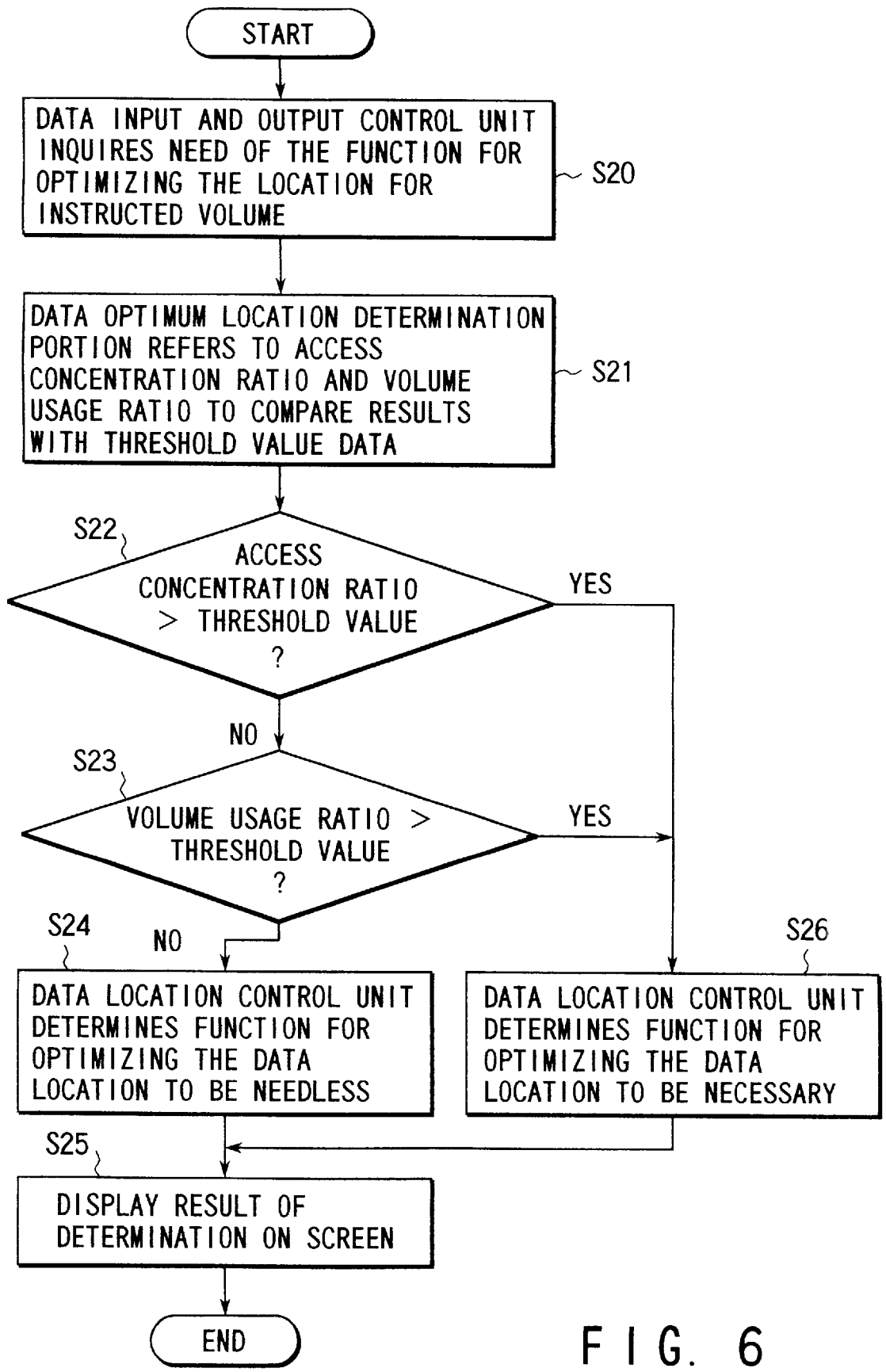
FIG. 6 is a flow chart of the operation of the first embodiment.

FIG. 1 is a block diagram showing an essential portion of a computer system according to a first embodiment. FIG. 2 is a conceptual view showing the software structure according to the embodiment. FIGS. 5, 6 and 7 are flow charts for explaining the operation of this embodiment.

System Structure

The computer system according to this embodiment is structured on an assumption of, for example, a server, to, as shown in FIG. 1, comprise a central processor unit (CPU) 1 for the system, a memory 2 for storing data groups including programs (module groups) software according to this embodiment and various data tables as well as cached data, a network communication control device 3 to establish the connection with another system through a network, a keyboard 6 and a mouse 5 which are operated by a user to input information, a CRT display unit 7 for displaying information including the state of the system and a hard disk (HDD) unit 8.

The system has a magnetooptical disk auto-changer (hereinafter called "auto-changer") 4, a bus 9 for connecting the respective devices and interface devices 10 to 15 provided for corresponding devices. The auto-changer 4 includes slots 21 for accommodating a plurality of magnetooptical disks (hereinafter called "disks"), a carrier 22 for taking the disk 20 from the slot 21 to move the same to a disk drive 23 and a plurality of the disk drives 23. The disk drives 23 perform read/write of data to and from the disk 20 set by the carrier 22.

As shown in FIG. 2, the system according to this embodiment has a software structure consisting of a program module group and a data table group according to this embodiment. The program module group and the data table group are estimated to be stored in the memory 2. The CPU 1 executes an application software 30 to make an access to the disk 20 in the auto-changer 4 to make a reference stored in the disk 20 or newly write data or update data.

The program module group according to this embodiment includes a drive control portion 31 for controlling the auto-changer 4, a data input/output control unit 32 for controlling input and output of data to and from the disk 20, a volume managing portion 33 for managing a volume which is the above-mentioned logical data storage unit, a disk managing portion 34 for managing disks, a data location control unit 35 for controlling a process for converting data location when the data location method is changed, a data optimum location determination portion 37 for determining whether or not the present data location in the volume is optimum and a data location address generating portion 36 for generating data location address in the volume in which the function for optimizing the data location is used.

The data table group includes a data storage management table 40 for managing the location of data to be stored in the disk 20, a volume management table 41 for collectively controlling the volumes, a disk management table 42 for describing the state of the disks and threshold-value data 43 including various parameters for determining the suitability of the function for optimizing the location.

Operation of the Embodiment

The volume management table 41 according to this embodiment has the internal structure as shown in FIG. 3. That is, the volume management table 41 consists of volume ID, volume names, configuration of ID of disks forming the volume, the capacity and usage ratio of each volume, a flag indicating the function for optimizing the data location is being used for the volume and an access concentration ratio with respect to the volume.

The usage ratio of the volume indicates the ratio of the capacity of data which is actually used in the volume. The data access concentration ratio can be obtained by the following Equation (1):

$$\text{Access Concentration ratio} = 100 - \{(\text{number of positions of blocks accessed within a predetermined time})/(\text{number of all blocks forming the volume}) \times 100)\} \quad (1)$$

The number of blocks, to which accesses have been made in a predetermined time, is the number of logical blocks to and from which data reading operations or writing operations have been performed from start of measurement to the subject moment. If an access is made to only the same logical block in a predetermined time, the foregoing number is "1". The foregoing number is obtained from the data storage management table 40. The total number of blocks forming the volume is the total number of blocks in each disk forming the volume.

The data storage management table 40 according to this embodiment is a table for managing each volume and indicating the relationship between the logical address and the physical address, as shown in FIG. 4. That is, data corresponding to the logical address indicates the physical address, which is the position on the disk physically forming the volume. Each row of the data storage management table 40 manages information of one logical address, while row offset corresponds to the logical address in the volume. Specifically, physical address "10003" corresponding to logical address "3" of the third row indicates a fact that data is physically stored at the position, which is in-plane offset position of "3" on plane B of disk ID3.

Data Input and Output Processes

Figures 13, 14:
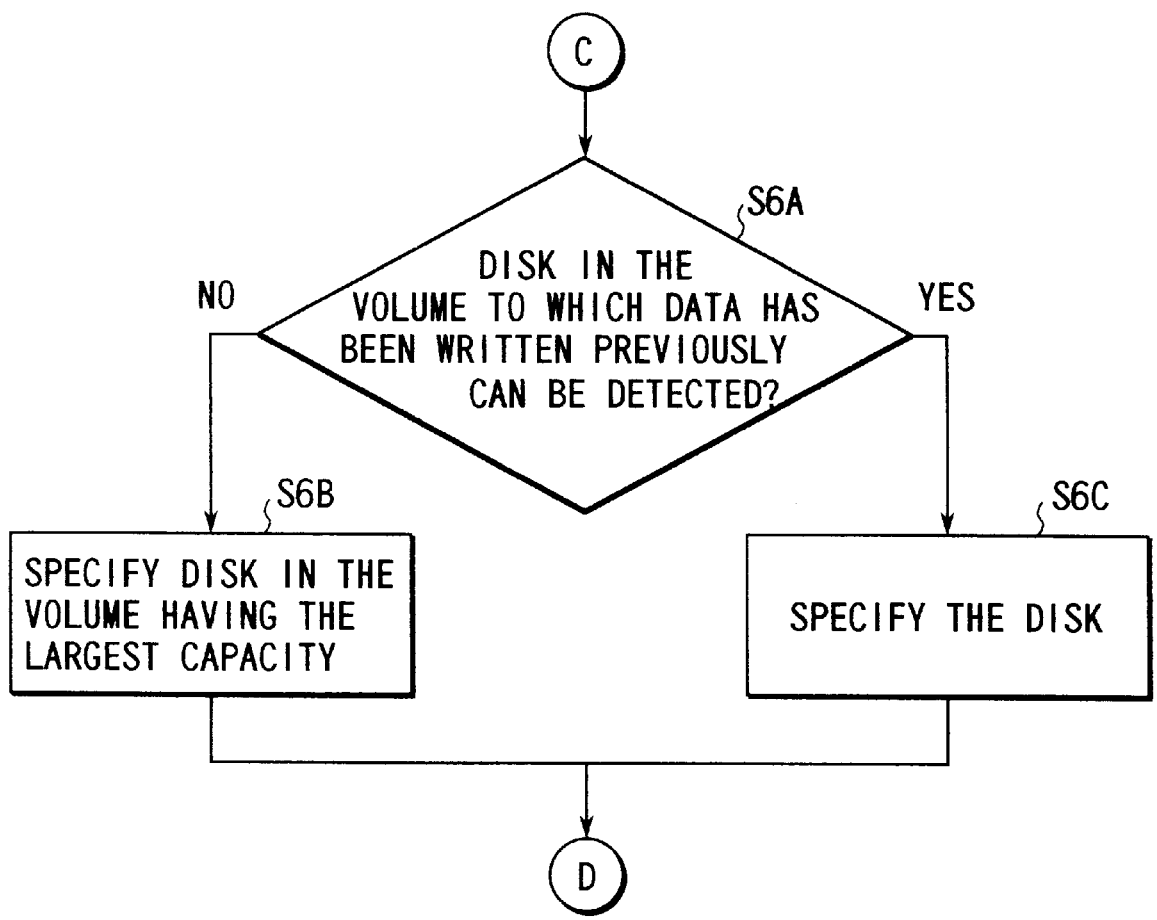
FIG. 13 is a flow chart for explaining how the first embodiment performs a process which relates to the flow chart of FIG. 5.
FIG. 14 is a diagram showing a menu displayed on the CRT screen of the first embodiment, enabling a user to release the optimum data location function.

Referring to flow charts shown in FIGS. 5 and 13, data input and output processes according to this embodiment will now be described. When a demand of an access (data read/write access) to a volume has been generated from the application software 30, the data input/output control unit 32 accepts the access demand (steps S1 and S2). The access demand includes the type of data read/write, ID of the volume to which access is being made, the number (offset) of the logical block in the volume which is the subject of the access and the address a transfer data buffer.

The data input/output control unit 32 makes an inquiry to the volume managing portion 33 in order to obtain the physical address value on the disk from the logical address value, which is the subject of the data input and output (step S3). In a case where the required process is a read access, the volume managing portion 33 obtains, from the data storage management table 40, a portion (ID of physical disk and physical block offset) in which the physical data is stored and which corresponds the logical address required to perform the process (YES in step S4, and in step S8). The data input/output control unit 32 reads instructed data from the physical offset on the instructed disk (step S9).

If the required process is not a read access but a write address is required, the volume managing portion 33 makes a reference to the volume management table 41 to confirm whether or not data in the volume uses the function for optimally locating data between disks (NO in step S4, and step S5). If the function for optimizing the location is used, it is determined whether or not a disk exists in the volume, to which writing has been performed at the previous operation (YES in step S6, and step S6A, both shown in FIG. 13). This decision can be made by referring to the disk ID used in the previous data-writing into the volume management table shown in FIG. 3. If the determination results iS YES, then the disk is specified. Then, the position of an empty block is obtained from the specified disk (step S6C shown in FIG. 13 and step S10 shown in FIG. 5). If the determination results in NO, then a disk having the largest empty capacity is specified among disks in the volume to obtain the position of the empty block from the specified disk (step S6B shown in FIG. 13 and step S10 shown in FIG. 5).

If the disk to which data has been written previously is not using the function for optimizing the location, the disk and the block offset in the disk are calculated in accordance with the following Equations (2) and (3) (step S7):

Logical disk number=(logical block offset/number of disks in the volume) (2)

Physical block offset=(physical block offset % number of disks in the volume) (3)

where "%" is an operator for obtaining the remainder which results in when the logical block offset is divided by the size of one disk (i.e., number of blocks).

Here it is assumed that the disks constituting a volume have the same storage capacity. The ID of the physical disk is obtained from the volume management table 41 in accordance with the logical disk number.

After the ID of the physical disk and the physical offset have been obtained as described above, the data input/output control unit 32 writes data on the physical offset on the instructed disk (step S11).

Then, the volume managing portion 33 calculates the access concentration ratio and the volume usage ratio (step S12). After the calculations have been performed, the volume managing portion 33 updates information in the data storage management table 40 and completes the process (step S13).

Process of Determining Optimum Location of Data

A process for automatically determining whether or not the function for optimizing the data location between disks is required for the volume will now be described with reference to a flow chart shown in FIG. 6.

When the data input/output control unit 32 has accepted a process for demanding to make an access to data in the volume, the data input/output control unit 32 inquires the data optimum location determination portion 37 whether or not the function for optimizing the data location is required for the volume (step S20). The data optimum location determination portion 37 makes a reference to the access concentration ratio and the volume usage ratio on the volume management table 41 so as to execute a process for making a comparison with the threshold-value data 43 (step S21).

If the access concentration ratio and/or the volume usage ratio is greater than the threshold-value data 43 as a result of the comparison above, the data optimum location determination portion 37 determines the function for optimizing the data location to be required and notifies the data input/output control unit 32 this fact (steps S22, S23 and S26). The data input/output control unit 32 displays a result of the determination on the screen of the CRT display unit 7, for example, as shown in FIG. 12, to notify a system administrator the result (step S25). If the result and the actual contents set to the volume are different from each other, setting must be changed.

If both of the access concentration ratio and the volume usage ratio are found to be smaller than the threshold-value data 43, the data optimum location determination portion 37 determines that the function for optimizing the location is not required and notifies the data input/output control unit 32 this fact (steps S22, S23 and S24). Similarly to the above-mentioned process, the data input/output control unit 32 displays the result of the determination on the screen of the CRT display unit 7, for example, as shown in FIG. 14.

If the result of the determination differs from the actual contents of setting for the volume, setting for the volume must be changed. If the function for optimizing the location is determined to be necessary in the case where the function for optimizing the location is not used for the volume, the data optimum location determination portion 37 instructs the data location control unit 35 to start a process for relocating data in the volume in order to use the function for optimizing the location for the volume. In response to this, the data location control unit 35 generates the data storage management table 40 for the volume to manage the logical block number, ID of the corresponding physical disk and information relating to the physical block number. Moreover, a flag in the volume management table 41 for setting use of the function for optimizing the location is set to YES (refer to FIG. 3).

To suppress the function for optimizing the data location, being used by a volume, it is necessary to relocate data. The data relocation will be described with reference to a flow chart shown in FIG. 7.

First, internal parameter X for managing the logical block number is initialized to zero (step S29). The data location control unit 35 refers to the data storage management table 40 to obtain physical block number PA corresponding to logical block X (step S30). Then, physical block PB is calculated in accordance with the following Equations (4) and (5) (step S31).

Logical disk number=(X/number of disks in the volume) (4)

Physical block PB=(X% number of disks in the volume) (5)

where "%" is an operator for obtaining the remainder which results in when the logical block X is divided by the size of one disk (i.e., number of blocks).

In the present embodiment, the disks constituting one volume have the same storage capacity. The ID of the physical disk is read from the volume management table 41 in accordance with the logical disk number. The physical block PB is a physical block number in which data must be stored in the case where the function for optimizing the data location is not used.

The data location control unit 35 interchanges data stored in the physical blocks PA and PB (step S32). The data storage management table 40 is changed by making the physical block corresponding to X to be PB. The logical block corresponding to physical block PB is obtained from the data storage management table 40 (step S33). Then, the data location control unit 35 changes the data storage management table 40 to make the physical blocks corresponding to the logical block to be PB and PA (step S34). Then, the data location control unit 35 changes the data storage management table 40 to make the physical blocks corresponding to the logical block X to be PB and PA (step S35). The foregoing process is performed for all of logical blocks in the volume (steps S36 and S37). Then, the volume managing portion 33 changes the flag in the volume management table 41 for using the function for optimizing the location into NO, and then deletes a portion of the data storage management table 40 for managing information for data location in the volume. Thus, the process is ended.

Second Embodiment

FIGS. 8 to 11 are diagrams showing a second embodiment. The second embodiment has a structure such that the above-mentioned function for optimizing the location of data is arranged to be a system having a function of preparing a plurality of data location plans to select an optimum data location plan to be adaptable to the data access environment in the volume.

Figure 9:
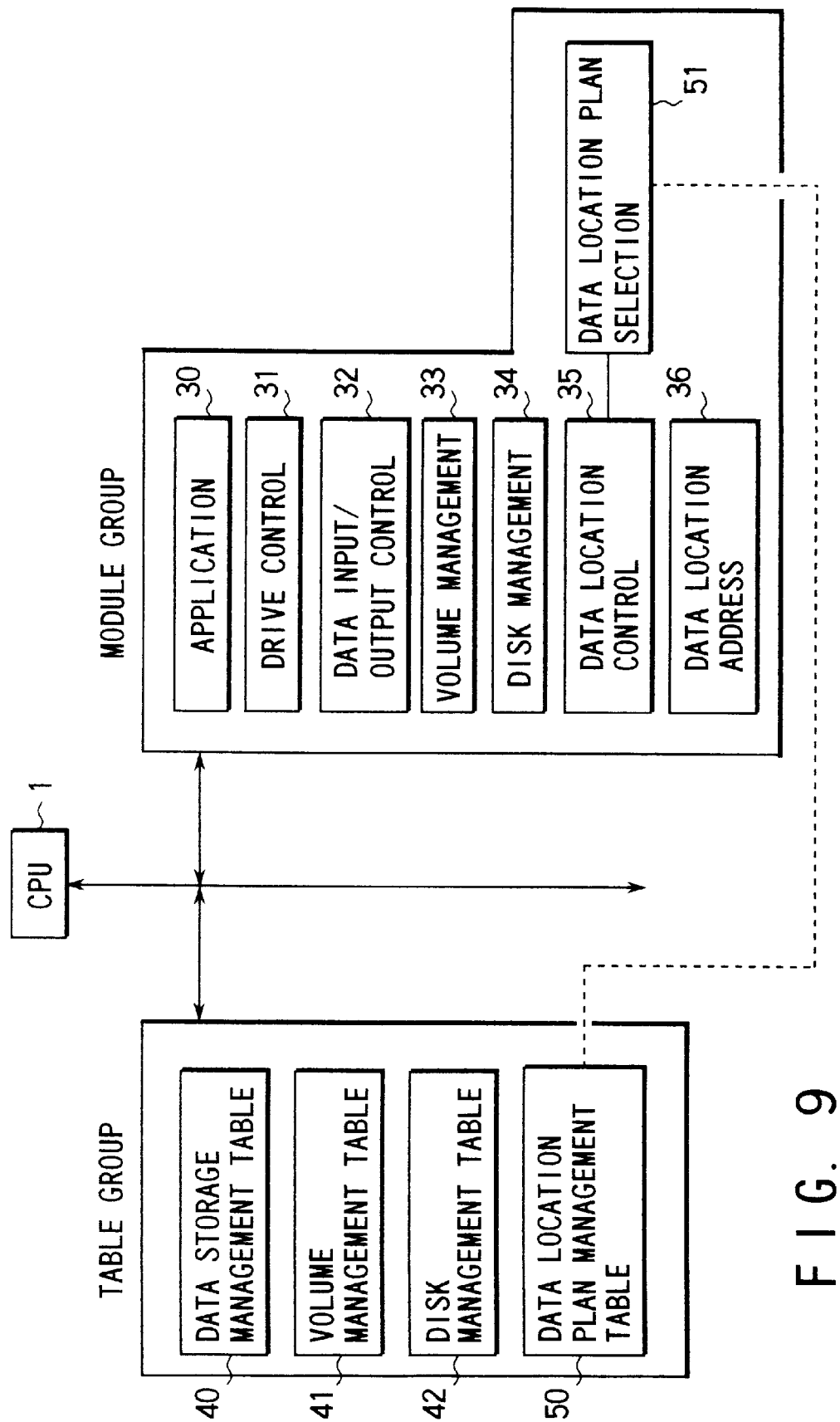
FIG. 9 is a diagram showing the software structure according to the second embodiment.

The system software structure according to this embodiment, as shown in FIG. 9, has, in the module thereof, a data location plan selection portion 51 and a data location plan management table 50 as a table group. The data location plan selection portion 51 selects the optimum data location plan to make greatest the performance for making an access to the volume in accordance with the environment for making an access to data in the volume. The data location plan management table 50 stores information of a plurality of data location plans which can be performed in the system.

Specifically, the data location plan management table 50 has information as shown in FIG. 11. That is, the first location plan (having plan ID of 0) is a simply-contiguous type plan with which a plurality of disks are simply connected to each other to form a continuous logical address space. The foregoing plan is structured similarly to the case where the function for optimizing the data location according to the first embodiment is not used, the foregoing plan having a volume usage ratio of lower than 20% which is set as condition (threshold value) information.

A second location plan (having plan ID of 1) is a concentrated-data-access type plan. The foregoing plan is structured on a premise that data accesses are concentrated to a portion of blocks and arranged such that the physical portions to which data is stored are concentrated to a specific disk surface regardless of the logical block number. After the disk surface has been fully filled with data, another side is instructed into which data is concentrically stored. As information of conditions under which the foregoing plan is applied, the volume usage ratio must be not lower than 20% and the access concentration ratio must be not lower than 70%.

A third location plan (having plan ID of 2) is a sequential access type plan. The foregoing plan is structured on a premise that the data accesses are performed sequentially. The foregoing plan is arranged to select a disk having the largest number of successive empty blocks, the number of which is larger than the average number of successive blocks in the volume to write data. Then, when a data reading process is performed, the possibility that the physical blocks are continued can be raised so that a higher speed process is performed. As information of conditions under which the foregoing plan is selected, the attribute of data must be instructed as dynamic images and the average accessible number of continuous blocks must be 300 blocks or more.

The average accessible number of continuous blocks and the average number of blocks which are successively transferred when data input and output are processed with respect to the volume will be described. The volume managing portion 33 manages the foregoing values while monitoring data input and output processes. When a data access to the volume is made, statistical data is updated.

The attribute of data in the volume is set to the volume managing portion 33 by a user of the system. A volume management table 27 according to this embodiment is structured as shown in FIG. 10. For example, a volume having volume ID of "3" has volume name of "XYZ", the IDs of the disks forming the volume are 6 and 8, and the total capacity of the volume is 5 giga bytes. The volume usage ratio is 20%, ID of the location plan which is being applied is "0" (the media simple-connection type), the access concentration ratio is 20% and the average length of accessible successive blocks is 10 blocks. Moreover, the data type attribute in the foregoing volume is not instructed as dynamic images also known as motion pictures. On the other hand, the volume having volume ID of "1" has the data type attribute of dynamic images. The ID of the location plan is "2" (sequential access type).

In a case where the location plan is changed, the data location control unit 35 automatically relocates data in the volume. The foregoing system is structured such that, as data in the volume is managed, an optimum data location plan for the life stage of the volume is automatically selected in accordance with the volume usage ratio, the access concentration ratio, the average length of the accessible successive blocks and the data type attribute in the volume instructed by the user. In accordance with the selected plan, the location is automatically converted to satisfy the plan.

The data location process according to this embodiment will now be described with reference to a flow chart shown in FIG. 8. Initially, internal parameter X of the data location plan management table 50 is initialized to zero (step S40). The data location control unit 35 refers to the data location plan management table 50 to obtain the adaptable condition (condition information) corresponding to the location plan X (step S41). The data location control unit 35 determines whether or not the instructed volume satisfies the adaptable condition (condition information) for the ID "0" of the data location plan management table 50 (step S42). If the adaptable condition cannot be satisfied, the data location control unit 35 obtains the adaptable condition (condition information) of next ID, which is "1", from the data location plan management table 50 (steps S45 and S46).

If the instructed volume satisfies the adaptable condition, the data location control unit 35 registers the value of X to the recommended location plan list (NO in step S43 and step S44). The data location plan selection portion 51 determines whether or not the location plan corresponding to the value of X in the recommended location plan list exists in the data location plan management table 50. If the location plan exists, the recommended location plan list is displayed on the screen of the CRT display unit 7 (step S47). If an instruction is made on the screen from the system administrator, the data location control unit 35 performs the data location optimizing process for the instructed volume in accordance with the location plan selected by the data location plan selection portion 51.

Although the first and second embodiments have been described to have the magnetooptical disk apparatus as the information storage device, the information storage device is not limited to this. If the information storage device uses a plurality of storage mediums which are physically separated from one another, a system using, for example, magnetic disk apparatus, may be employed.

As described above, according to the present invention, the information storage system, for example, the magnetooptical disk auto-changer, using a plurality of interchangeable disks and having a very large capacity, enables the validity of the function for optimally locating data to be determined in accordance with the data utilization environment, such as the access concentration ratio and the volume usage ratio, and the data access characteristic. Therefore, the continuation process, the suspension process or the data relocation process can be performed in accordance with the result of the determination. As a result, the data location can be optimized to be adaptable to the data utilization environment and the data access characteristic. By preparing an optimum data location plan adaptable to the data access environment, an optimum data location plan adaptable to the data access environment to the volume can be selected. As a result, the function for optimizing the data location, which is the optimum data location adaptable to the data access environment to the volume, can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. Apparatus for optimizing data transfer in a storage system, comprising:
    data transfer means for transferring data in the storage system in accordance with a current data transfer function which includes one of a regular data transfer function and an optimization data transfer function;
    collection means for collecting information in terms of access per unit time to an area of the storage system;
    determination means responsive to the collection means for comparing the information in terms of access per unit time to a predetermined threshold to determine whether the current data transfer function should be changed; and
    relocation means for relocating data in the storage system when the determination means determines that the current data transfer function should be changed to the optimization data transfer function.

2. The apparatus according to claim 1, wherein the storage system comprises logical volumes of data and wherein the data transfer means comprises means for transferring logical volume data in accordance with the current data transfer function associated with each volume.

3. The apparatus according to claim 1, further comprising:
    indicator means responsive to the determination means for providing an indication to a user that the current data transfer function should be changed.

4. The apparatus according to claim 1,
    wherein the collection means further comprises means for collecting information regarding usage in the storage system; and
    wherein the determination means further comprises means for comparing the information regarding usage to a predetermined threshold.

5. The apparatus according to claim 4, wherein the means for collecting information regarding usage comprises means for collecting information in terms of amount of storage used.

6. An apparatus for optimizing data transfer in a storage system comprising:
    data transfer means for transferring data in the storage system in accordance with a current data transfer function that includes one of a regular data transfer function and an optimization data transfer function;
    collection means for collecting information in terms of access per unit time to an area of the storage system;
    determination means responsive to the collection means for comparing the information in terms of access per unit time to a predetermined threshold to determine whether the current data transfer function should be changed; and
    function change means responsive to the collection means and the determination means for selectively changing the current data transfer function in dependence upon the information in terms of access per unit time.

7. The apparatus according to claim 6, wherein the function change means comprises means for selectively changing the current data transfer function to one of plural possible optimization data transfer functions in dependence upon the the information in terms of access per unit time.

8. The apparatus according to claim 6, further comprising:
    relocation means for relocating data in the storage system when the determination means determines that the current data transfer function should be changed.

9. The apparatus according to claim 6, wherein the storage system comprises logical volumes of data and wherein the data transfer means comprises means for transferring logical volume data in accordance with a current transfer function associated with each volume.

10. The apparatus according to claim 6, further comprising:
    indicator means responsive to the determination means for providing an indication to a user that the current data transfer function should be changed.

11. The apparatus according to claim 6,
    wherein the collection means further comprises means for collecting information regarding usage in the storage system; and
    wherein the determination means further comprises means for comparing the information regarding usage to a predetermined threshold.

12. The apparatus according to claim 11, wherein the means for collecting information regarding usage comprises means for collecting information in terms of amount of storage used.

13. The apparatus according to claim 6, wherein the collection means further comprises means for collecting information regarding average length of accessible successive blocks; and
    wherein the determination means further comprises means for comparing the information regarding the average length of accessible successive blocks to a predetermined threshold.

14. The apparatus according to claim 6, wherein the determination means further comprises means for comparing a predetermined data type attribute to a data type attribute of data transferred in the system.

15. The apparatus according to claim 14, further comprising means for allowing a user to define the predetermined data type attribute.

16. The apparatus according to claim 6, wherein the function change means further comprises iterative means for iteratively comparing characteristics of data transfer in the storage system with predefined characteristics associated with respective data transfer functions.

17. A method for optimizing data transfer in a storage system, including steps of:
    transferring data in the storage system in accordance with a current data transfer function which includes one of a regular data transfer and an optimization data transfer function;
    collecting information in terms of access per unit time to an area of the storage system;
    comparing the information in terms of access per unit time to a predetermined threshold to determine whether the current data transfer function should be changed; and
    relocating data in the storage system when the step of comparing determines that the current data transfer function should be changed to the optimization data transfer function.

18. The method according to claim 17, wherein the storage system comprises logical volumes of data and wherein the transferring step includes the substep of transferring logical volume data in accordance with a current transfer function associated with each volume.

19. The method according to claim 17, further including providing an indication to a user that the current data transfer function should be changed responsive to the comparing step.

20. The method according to claim 17,
wherein the step of collecting further includes a substep of collecting information regarding usage in the storage system; and
wherein the step of comparing further includes a substep of comparing the information regarding usage to a predetermined threshold.

21. The method according to claim 20, wherein the step of collecting information regarding usage includes a substep of collecting information in terms of amount of storage used.

22. A method for optimizing data transfer in a storage system, including the steps of:
transferring data in the storage system in accordance with a current data transfer function which includes one of a regular data transfer and an optimization data transfer function;
collecting information in terms of access per unit time to an area of the storage system; and
comparing the information in terms of access per unit time to a predetermined threshold to determine whether the current data transfer function should be changed; and
selectively changing the current data transfer function in dependence upon the information in terms of access per unit time.

23. The method according to claim 22, wherein the step of selectively changing includes a substep of selectively changing the current data transfer function to one of plural possible optimization data transfer functions in dependence upon the the information in terms of access per unit time.

24. The method according to claim 22, further including a substep of:
relocating data in the storage system when the step of comparing determines that the current data transfer function should be changed.

25. The method according to claim 22, wherein the storage system comprises logical volumes of data and wherein the step of transferring includes a substep of transferring logical volume data in accordance with a current transfer function associated with each volume.

26. The method according to claim 22, further including a step of:
providing an indication to a user that the current data transfer function should be changed responsive to the comparing step.

27. The method according to claim 22,
wherein the step of collecting further includes a substep of collecting information regarding usage in the storage system; and
wherein the step of comparing further includes a substep of comparing the information regarding usage to a predetermined threshold.

28. The method according to claim 27, wherein the step of collecting information regarding usage includes a substep of collecting information in terms of amount of storage used.

29. The method according to claim 22,
wherein the step of collecting further includes a substep of collecting information regarding average length of accessible successive blocks; and
wherein the step of comparing further includes a substep of comparing the information regarding the average length of accessible successive blocks to a predetermined threshold.

30. The method according to claim 22, wherein the substep of comparing further includes a substep of comparing a predetermined data type attribute to a data type attribute of data transferred in the system by the transferring step.

31. The method according to claim 30, further including a step of allowing a user to define the predetermined data type attribute.

32. The method according to claim 22, further including a step of iteratively comparing characteristics of data transfer in the storage system with predefined characteristics associated with respective data transfer functions.

33. The apparatus according to claim 1, wherein the storage system comprises logical volumes of data, and said collection means collects, as the information in term of access per unit time, an access concentration ratio defined by:

$$100 - \{(\text{number of blocks accessed within a predetermined time})/(\text{number of all blocks forming the volume}) \times 100)\}$$

wherein the number of blocks accessed within a predetermined time is the number of logical blocks from which and to which data reading operations or writing operations, respectively, have been performed.

34. The apparatus according to claim 4, wherein said collection means collects a data usage ratio, which is a ratio of a capacity of data that is actually used, as the information regarding usage.

35. The method according to claim 17, wherein the storage system comprises logical volumes of data, and said step of collecting collects, as the information in term of access per unit time, an access concentration ratio defined by:

$$100 - \{(\text{number of blocks accessed within a predetermined time})/(\text{number of all blocks forming the volume}) \times 100)\}$$

wherein the number of blocks accessed within a predetermined time is the number of logical blocks from which and to which data reading operations or writing operations, respectively, have been performed.

36. The method according to claim 20, wherein said step of collecting collects as the information regarding usage a data usage ratio which is a ratio of a capacity of data which is actually used.

37. An apparatus for optimizing data in a storage system having plural disks and plural logical storage units in the plural disks, comprising:
collection means for collecting information regarding at least one of usage and access of each of said logical storage units;
means for determining a data relocate region to which data is relocated based on the information collected by said collecting means; and
data relocation means for relocating data to the data relocate region determined by said determining means.

38. The apparatus according to claim 37, wherein said data relocate region is a continuous logical storage address space which is formed by connecting disks in a logical storage unit.

39. The apparatus according to claim 37, wherein said data relocate region is a region concentrated to one of plural disks in a logical storage unit.

40. The apparatus according to claim 25, wherein said data relocate region is a region in a disk having the largest number of successive empty storage units.

41. The apparatus according to claim 37, further comprising:
selection means for selecting a data relocate configuration for each of said logical storage units based on information collected by said collection means.

42. The apparatus according to claim 41, wherein selectable data relocate configurations include a continuous logical storage address configuration, a concentrated configuration, and a sequential access configuration.

43. A method for optimizing data in a storage system having plural disks and plural logical storage units in the plural disks, comprising:
collecting information regarding at least one of usage and access of each of said logical storage units;
determining a data relocate region to which data is relocated based on the collected information; and
relocating data to the determined data relocate region based on the determination.

44. The method according to claim 43, wherein the determining step determines that the data relocate region is a continuous logical storage address space which is formed by connecting disks in a logical storage unit.

45. The method according to claim 43, wherein the determining step determines that the data relocate region is a region concentrated to one of plural disks in a logical storage unit.

46. The method according to claim 43, wherein the determining step that determines the data relocate region is a region in a disk having the largest number of successive empty storage units.

47. The method according to claim 43, further comprising:
selecting a data relocate configuration for each of said logical storage units based on the collected information.

48. The method according to claim 47, wherein selectable data relocate configurations include a continuous logical storage address configuration, a concentrated configuration, and a sequential access configuration.

49. A data storage system having a logical storage unit which stores one of optimum-located data and non-optimum-located data, the system comprising:
collection means for collecting information in terms of access per unit time to the logical storage unit;
determination means for determining whether or not the data stored in said logical storage unit should be relocated based on a comparison result of the information collected by said collection means and a predetermined threshold value; and
relocation means for relocating the data stored in said logical storage unit when said determining means determines that the data stored in said logical storage unit should be relocated.

50. The system according to claim 49, further comprising indicator means for providing an indication to a user that the data stored in said logical storage unit should be relocated when said determining means determines that the data stored in said logical storage unit should be relocated.

51. The system according to claim 49, wherein
said collection means comprises means for collecting information regarding usage; and
said determination means comprises means for comparing the information regarding usage to a predetermined threshold.

52. The system according to claim 51, wherein said means for collecting information regarding usage comprises means for collecting information in terms of amount of storage used.

53. A data storage method having a logical storage unit which stores one of optimum-located data and non-optimum-located data, the method comprising the steps of:
collecting information in terms of access per unit time to the logical storage unit;
determining whether or not the data stored in said logical storage unit should be relocated based on a comparison result of the collected information and a predetermined threshold value; and
relocating the data stored in said logical storage unit when the step of determining determines that the data stored in said logical storage unit should be relocated.

54. The method according to claim 53, further comprising the step of providing an indication to a user that the data stored in said logical storage unit should be relocated when the step of determining determines that the data stored in said logical storage unit should be relocated.

55. The method according to claim 53, wherein the steps of
collecting information includes the step of collecting information regarding usage; and
determining comprises the step of comparing the information regarding usage to a predetermined threshold.

56. The system according to claim 55, wherein the step of collecting information regarding usage comprises the step of collecting information in terms of amount of storage used.

57. Apparatus for optimizing data transfer in a storage system, comprising:
data transfer means for transferring data in the storage system in accordance with a current data transfer function which includes one of a regular data transfer function and an optimization data transfer function;
collection means for collecting information in terms of access per unit time to an area of the storage system, for collecting information regarding usage in the storage system, and for collecting a data usage ratio, which is a ratio of a capacity of data that is actually used, as the information regarding usage;
determination means responsive to the collection means for comparing the information in terms of access per unit time to a predetermined threshold to determine whether the current data transfer function should be changed, the determination means further comprising means for comparing the information regarding usage to a predetermined threshold; and
relocation means for relocating data in the storage system when the determination means determines that the current data transfer function should be changed to the optimization data transfer function.

58. Apparatus for optimizing data transfer in a storage system, comprising:
data transfer means for transferring data in the storage system in accordance with a current data transfer function which includes one of a regular data transfer function and an optimization data transfer function;
collection means for collecting information in terms of access per unit time to an area of the storage system;
determination means responsive to the collection means for comparing the information in terms of access per unit time to a predetermined threshold to determine whether the current data transfer function should be changed; and relocation means for relocating data in the storage system when the determination means determines that the current data transfer function should be changed to the optimization data transfer function; and wherein the storage system comprises logical volumes of data, and said collection means collects, as the information in term of access per unit time, an access concentration ratio defined by:

$$100-\{(\text{number of blocks accessed within a predetermined time})/(\text{number of all blocks forming the volume})\times 100)\}$$

wherein the number of blocks accessed within a predetermined time is the number of logical blocks from which and to which data reading operations or writing operations, respectively, have been performed.

59. A method for optimizing data transfer in a storage system, including steps of:

transferring data in the storage system in accordance with a current data transfer function which includes one of a regular data transfer and an optimization data transfer function;

collecting information in terms of access per unit time to an area of the storage system and information regarding usage in the storage system that is a data usage ratio that is a ratio of a capacity of data that is actually used;

comparing the information in terms of access per unit time to a predetermined threshold to determine whether the current data transfer function should be changed, and the information regarding usage to a predetermined threshold; and relocating data in the storage system when the step of comparing determines that the current data transfer function should be changed to the optimization data transfer function.

60. A method for optimizing data transfer in a storage system, including steps of:

transferring data in the storage system in accordance with a current data transfer function which includes one of a regular data transfer and an optimization data transfer function;

collecting information in terms of access per unit time to an area of the storage system;

comparing the information in terms of access per unit time to a predetermined threshold to determine whether the current data transfer function should be changed; and relocating data in the storage system when the step of comparing determines that the current data transfer function should be changed to the optimization data transfer function; and wherein the storage system comprises logical volumes of data, and said step of collecting collects, as the information in term of access per unit time, an access concentration ratio defined by:

$$100-\{(\text{number of blocks accessed within a predetermined time})/(\text{number of all blocks forming the volume})\times 100)\}$$

wherein the number of blocks accessed within a predetermined time is the number of logical blocks from which and to which data reading operations or writing operations, respectively, have been performed.

61. An apparatus for optimizing data in a storage system having plural disks and plural logical storage units in the plural disks, comprising:

collection means for collecting information regarding at least one of usage and access of each of said logical storage units;

means for determining a data relocate region to which data is relocated based on the information collected by said collection means, wherein said data relocate region is one of a continuous logical storage address space that is formed by connecting disks in a logical storage unit, a region concentrated to one of plural disks in a logical storage unit, and a region in a disk having the largest number of successive empty storage units; and data relocation means for relocating data to the data relocate region determined by said determining means.

62. An apparatus for optimizing data in a storage system having plural disks and plural logical storage units in the plural disks, comprising:

collection means for collecting information regarding at least one of usage and access of each of said logical storage units;

means for determining a data relocate region to which data is relocated based on the information collected by said collection means;

data relocate means for relocating data to the data relocate region determined by said determining means; and selection means for selecting a data relocate configuration for each of said logical storage units based on information collected by said collection means.

63. The apparatus according to claim 62, wherein selectable data relocate configurations include a continuous logical storage address configuration, a concentrated configuration, and a sequential access configuration.

64. A method for optimizing data in a storage system having plural disks and plural logical storage units in the plural disks, comprising:

collecting information regarding at least one of usage and access of each of said logical storage units;

determining a data relocate region to which data is relocated based on the collected information, wherein the data relocate region is one of a continuous logical storage address space which is formed by connecting disks in a logical storage unit, a region concentrated to one of plural disks in a logical storage unit, and a region in a disk having the largest number of successive empty storage units; and relocating data to the determined data relocate region based on the determination.

65. A method for optimizing data in a storage system having plural disks and plural logical storage units in the plural disks, comprising:

collecting information regarding at least one of usage and access of each of said logical storage units;

determining a data relocate region to which data is relocated based on the collected information;

relocating data to the determined data relocate region based on the determination; and selecting a data relocate configuration for each of said logical storage units based on the collected information.

66. The method according to claim 65, wherein selectable data relocate configurations include a continuous logical storage address configuration, a concentrated configuration, and a sequential access configuration.

* * * * *

UNITED STATES PATENT AND TRADEMARK OFFICE
CERTIFICATE OF CORRECTION

PATENT NO. : 6,173,362 B1
DATED : January 9, 2001
INVENTOR(S) : Nobuhisa YODA

It is certified that error appears in the above-identified patent and that said Letters Patent is hereby corrected as shown below:

Claim 7, col. 12, line 5, before "information", delete "the".
Claim 23, col. 13, line 40, before "information", delete "the".
Claim 40, col. 15, line 4, "claim 25" should read --claim 37--.

Signed and Sealed this

Fifteenth Day of May, 2001

Attest:

NICHOLAS P. GODICI

*Attesting Officer*    *Acting Director of the United States Patent and Trademark Office*